(12) United States Patent
Hackett et al.

(10) Patent No.: US 7,971,832 B2
(45) Date of Patent: Jul. 5, 2011

(54) WING TIP DEVICES

(75) Inventors: Kevin Christopher Hackett, Bedford (GB); Clive Robert Pyne, Bedford (GB)

(73) Assignee: Qinetiq Limited (GB)

( * ) Notice: Subject to any disclaimer, the term of this patent is extended or adjusted under 35 U.S.C. 154(b) by 222 days.

(21) Appl. No.: 11/661,031

(22) PCT Filed: Sep. 15, 2005

(86) PCT No.: PCT/GB2005/003553
§ 371 (c)(1),
(2), (4) Date: Feb. 23, 2007

(87) PCT Pub. No.: WO2006/030213
PCT Pub. Date: Mar. 23, 2006

(65) Prior Publication Data
US 2007/0252031 A1    Nov. 1, 2007

(30) Foreign Application Priority Data

Sep. 16, 2004  (GB) .................................. 0420601.7

(51) Int. Cl.
*B64C 3/16*    (2006.01)
*B64C 3/58*    (2006.01)

(52) U.S. Cl. ........................ 244/199.4; 244/47; 416/238

(58) Field of Classification Search ............... 244/199.4, 244/199.2, 199.1, 198, 130, 91, 47, 12.6; 416/238

See application file for complete search history.

(56) References Cited

U.S. PATENT DOCUMENTS

| | | | | | |
|---|---|---|---|---|---|
| 1,275,251 | A | * | 8/1918 | Harb | 244/12.6 |
| 3,411,738 | A | * | 11/1968 | Sargent | 244/199.2 |
| 3,974,986 | A | | 8/1976 | Johnstone | |
| 4,108,403 | A | * | 8/1978 | Finch | 244/199.2 |
| 4,595,160 | A | * | 6/1986 | Santos | 244/199.4 |
| 4,674,709 | A | * | 6/1987 | Welles | 244/199.4 |
| 4,975,022 | A | * | 12/1990 | Perry | 244/198 |
| 5,039,032 | A | | 8/1991 | Rudolph | |
| 5,332,362 | A | | 7/1994 | Toulmay et al. | |

(Continued)

FOREIGN PATENT DOCUMENTS

EP    0 351 104    1/1990

OTHER PUBLICATIONS

Desopper et al. "Effect on an Anhedral Sweptback Tip on the Performance of a Helicopter Rotor", Vertica, Pergamon Press, GB, vol. 12, No. 4, pp. 345-355 (1988).

*Primary Examiner* — Tien Dinh
*Assistant Examiner* — Richard R Green
(74) *Attorney, Agent, or Firm* — McDonnell Boehnen Hulbert & Berghoff LLP (57) ABSTRACT

A tip device to act as an outboard continuation of an aircraft wing or other aerodynamic lifting surface has a downward cant angle, a leading edge swept back in relation to the leading edge of the inboard lifting surface, and a chord reducing in the outboard direction of the device. A favourable balance between induced drag reduction and increased wing root bending moment can thereby be achieved. Preferably the device also has an upwardly canted portion at its root end so that the downward cant commences from a relatively elevated spanwise location, thereby alleviating any ground clearance problems.

23 Claims, 5 Drawing Sheets

U.S. PATENT DOCUMENTS

| | | |
|---|---|---|
| 5,348,253 A | 9/1994 | Gratzer |
| 5,634,613 A | 6/1997 | McCarthy |
| 6,000,911 A | 12/1999 | Toulmay et al. |
| 6,089,502 A | 7/2000 | Herrick et al. |
| 6,474,604 B1 * | 11/2002 | Carlow .................. 244/198 |
| 6,484,968 B2 * | 11/2002 | Felker .................. 244/199.4 |
| 6,547,181 B1 | 4/2003 | Hoisington et al. |
| 6,578,798 B1 * | 6/2003 | Dizdarevic et al. ........ 244/199.1 |
| 6,722,615 B2 * | 4/2004 | Heller et al. ................ 244/199.4 |
| 6,772,615 B2 | 8/2004 | Hagiwara et al. |
| 2004/0061029 A1 | 4/2004 | McCarthy |

\* cited by examiner

WING TIP DEVICES

BACKGROUND OF THE INVENTION (1) Field of the Invention

The present invention relates to tip devices for aerodynamic lifting surfaces. In principle devices according to the invention may be employed to improve the performance of lifting surfaces of numerous kinds including aircraft wings, helicopter blades, propeller blades and so on, although they may find particular utility as extensions for the main wings of high subsonic speed, medium and long range passenger and transport aircraft, including airliners and corporate/business jets, of the class containing examples to which conventional winglets are currently fitted.

(2) Description of the Art

There is always a desire to improve the performance of aircraft by reducing drag. For high subsonic speed aircraft the three main drag components are viscous, wave and lift-dependant (i.e. induced) drag and for a typical high speed cruise condition approximately 50% of the total drag force is due to induced drag. A strong interest therefore exists in the effects of wing planform and tip shape on induced drag. One result has been the fitting of so-called winglets to such aircraft as the Airbus A340 and Boeing 747-400. These winglets are upwardly canted, generally planar devices extending from the wing tips which effectively increase the aspect ratio of the wing and utilise the cross flow occurring around the tip to reduce the intensity and concentration of the trailing vortex and thereby reduce the induced drag. A developed form of such devices referred to as a "blended winglet" is described in U.S. Pat. No. 5,348,253. Another form of upwardly canted wing tip extension is described in U.S. Pat. No. 6,722,615. U.S. Pat. Nos. 5,039,032 and 6,089,502 describe another approach comprising highly tapered and raked back but uncanted wing tips, such as are fitted to the Boeing 767-400ER aircraft.

It is evident from a study of wing tip shapes that the most effective from the point of view of drag reduction are those which (i) improve the wing span-loading, (ii) position the tip vortex further outboard, and/or (iii) introduce a non-planar trailing vortex sheet, since one or a combination of these effects can result in a beneficial change to the downwash and hence a reduction in the induced drag. However, all such devices as described above carry the penalties of adding their own weight to the structure, additional drag due to increased wetted area, adverse interference and wing bending. One of the main concerns is the increase in the wing root bending moment in flight, due to the additional lift which they produce and its siting at the maximum span position. A consequence of meeting an increased wing root bending moment is an increase in the required wing structural strength and hence a still further increase in weight.

SUMMARY OF THE INVENTION

In one aspect the present invention seeks to provide a tip device which is capable of securing a favourable balance between reduction in induced drag and increase in root bending moment and accordingly in this aspect the invention resides in a tip device to act as an outboard continuation of an aerodynamic lifting surface wherein said device has a downward cant angle and in planform has a leading edge swept back in relation to the leading edge of the lifting surface inboard thereof, and a chord reducing in the outboard direction of the device.

This tip shape has the properties to influence the induced drag by adjusting the span loading and vortex sheet, which depends on a number of design variables including planform shaping and tip bending. The results from a study have revealed that a combination of these parameters had a beneficial effect on the vortex roll up in reducing the intensity and repositioning further outboard. The result of this is a reduction of induced drag combined with a much lower level of increase in wing root bending than would have been the case with planar or blended winglets. Studies have indicated that a canted down tip device is adapted to position the tip vortex outboard of the tip and that the concentration of trailing vortex roll up can be significantly reduced. Furthermore by virtue of the sweep and reducing chord this device will not load up the tip region, as the angle of incidence of the lifting surface is increased, at the same rate as a conventional winglet, and therefore will involve a lesser increase in root bending moment. In addition the increase of wing root bending moment is also minimised due to the fact that the lift vector on the device is progressively rotated outboard with the downward cant and the offset of the horizontal projection of the lift vector relative to the wing root is much smaller than would be the case for a conventional upward canted winglet.

Preferably the sweep angle of the leading edge of the device increases (whether continuously or discontinuously) in the outboard direction thereof, and may reach a maximum of approximately 90° at the tip of the device. A large swept back planform assists in avoiding the formation of shock waves, and allows the adoption of blunt leading edge profiles with high thickness-to-chord ratio which improves low-speed performance without incurring a wave drag penalty at cruise.

The trailing edge of the device may also be swept back in relation to the trailing edge of the lifting surface, and may do so with an increasing sweep angle (whether continuously or discontinuously) in the outboard direction thereof. By raking back the device in this way the location of its centre of lift can be moved aft of the flexural axis of the main lifting surface which will also help to relieve root bending due to the fact that it will promote a reduction of twist at the tip and therefore reduce its incidence and hence tip loading. The extent of rake back is preferably such that the aft extension of the device, from the position from which the trailing edge of the device is swept back in relation to the trailing edge of the inboard lifting surface, is greater than two thirds of, and may be at least approximately equal to, the aerofoil chord length at said position.

The downward cant angle of the device also preferably increases (whether continuously or discontinuously) in the outboard direction thereof, and may reach a maximum of approximately 90° at the tip of the device. The extent of downward bending of the device is preferably such that the trailing edge at the tip of the device is located below the lower surface crest point of the aerofoil at the root of the device, and/or at the position from which the downward cant angle commences, by a distance of at least twice the maximum aerofoil thickness at the respective position.

In order to avoid any potential ground clearance problems when an aircraft wing is fitted with downwardly-canted tip devices in accordance with the invention, e.g. during taxi or other ground manoeuvres or in the event of a wing-low landing, the tip may effectively be raised by including an upwardly canted portion at the root end of the device, prior to the downwardly canted portion. This feature represents an independent aspect of the invention, although in other embodiments the downward cant may commence directly from or close to the root of the device (taking account of any dihedral angle of the inboard lifting surface).

Tip devices according to the invention may be retrofitted to existing aircraft wings (or other lifting surfaces) or incorporated in the design of new builds. In the case of retrofits these tip devices may, according to their design and the amount of existing wing structure replaced, also provide a useful span extension to the wing. In the case of new builds their structure may be integrated with the structure of the main lifting surface in the course of manufacture and references to a "tip device" in the accompanying claims do not necessarily imply the existence of the device as a separate article of manufacture.

DESCRIPTION OF THE FIGURES

The invention will now be more particularly described, by way of example, with reference to the accompanying drawings in which:

To be precise, FIGS. 2, 4 and 6 depict the spanwise loci of the upper and lower aerofoil crest points of the upper and lower surfaces of the respective tip devices.

DESCRIPTION OF A PREFERRED EMBODIMENT

Figure 1:
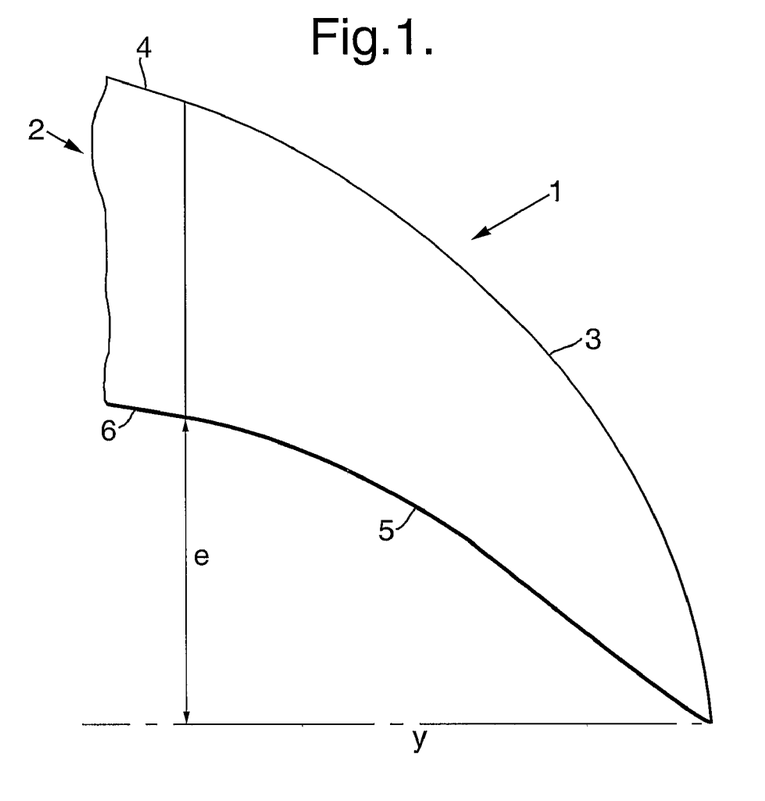
FIG. 1 is a plan view of a first illustrative embodiment of a tip device according to the invention as fitted to an aircraft wing.
Figure 2:
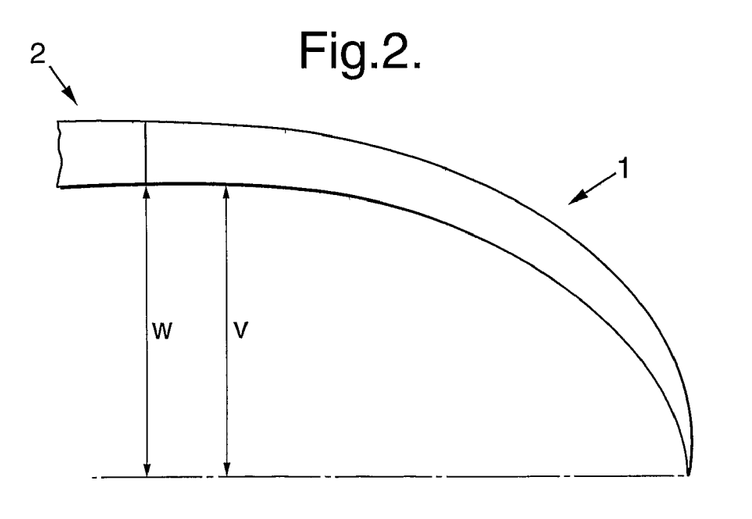
FIG. 2 is a view from the rear of the device of FIG. 1.

Referring to FIGS. 1 and 2, there is illustrated a first embodiment 1 of a tip device according to the invention as fitted to the outboard end of an otherwise conventional swept trapezoidal main plane (wing) 2 typical of present day high subsonic speed passenger and transport aircraft. In this case the starboard tip region of the wing is illustrated, it being understood that the port tip will be fitted with an equivalent device in mirror image to the device 1.

In planform, as shown in FIG. 1, the device 1 has a swept leading edge 3 of substantially elliptical form with a sweep angle continuously increasing in the outboard direction, blending from the angle of the inboard main wing leading edge 4 at the root of the device to an angle of substantially 90° at its tip. The trailing edge 5 of the device in this embodiment is curved back substantially parabolically, with a sweep angle continuously increasing in the outboard direction, blending from the angle of the inboard main wing trailing edge 6 at the root of the device to an angle of approximately 50° at its tip. The chord of the device reduces continuously in the outboard direction, approaching as close as practicable to zero where the leading and trailing edges meet at its tip. This planform exhibits a substantial degree of rake back, the aft extension e of the device, namely the distance as viewed in plan by which the trailing edge of the tip of the device is located aft of the trailing edge at the root of the device, is approximately equal to the aerofoil chord length at the root.

More particularly, the curve of the leading edge 3 of the tip device as viewed in plan corresponds substantially to an arc (less than one quarter) of an ellipse whose two principal axes are positioned (i) parallel to the longitudinal axis of the aircraft/line of flight and inboard of the device (x axis, not seen in FIG. 1) and (ii) orthogonal to the first axis and coincident with the tip of the device (y axis seen in FIG. 1). The lengths of these axes and the position of their origin will be determined in accordance with the desired span and rake back of the tip device 1, and the leading edge sweep angle of the main wing 2. A profile of this form provides a gradual increase of the local sweep angle of the edge 3 up to substantially 90° at the tip and can avoid the formation of leading edge vortices in the cruise condition which would incur a drag penalty. The curve of the trailing edge 5 of the tip device as viewed in plan in this embodiment corresponds substantially to an arc of a parabola, defined in the same geometric reference frame as the ellipse of the leading edge 3 and the coefficients of which will be determined in accordance with the desired span and rake back of the tip device, and the trailing edge sweep angle of the main wing.

As shown in FIG. 2, the device 1 is also canted downwards. In this respect it will be seen that the cant angle decreases continuously (or increases continuously in the negative sense) in the outboard direction, blending from the slight dihedral of the inboard main wing 2 at the root of the device to a negative angle of substantially 90° at its tip. The extent of downward bending in this embodiment, expressed as the vertical distance v by which the trailing edge at the tip of the device is located below the lower surface crest point of the aerofoil at the position of maximum elevation (or in other words the position from which, taking account of the main wing dihedral angle, the actual downward cant commences), is approximately five times the maximum aerofoil thickness at that position. In this embodiment the vertical distance w by which the trailing edge at the tip of the device is located below the lower surface crest point of the aerofoil at the root of the device is also approximately five times the maximum aerofoil thickness at that position.

The form of downward bending of the device as viewed in FIG. 2 is substantially elliptical. More particularly the downward bending is defined by the projection of the trailing edge curve in a (y,z) reference frame where y is directed as mentioned above and z is orthogonal to the plane identified by the (x,y) axes. This curve is generated as a rigid rotation about an axis parallel to the longitudinal axis of the aircraft/line of flight, passing through the outboard end of the main wing trailing edge, of a quarter of an ellipse.

Figure 3:
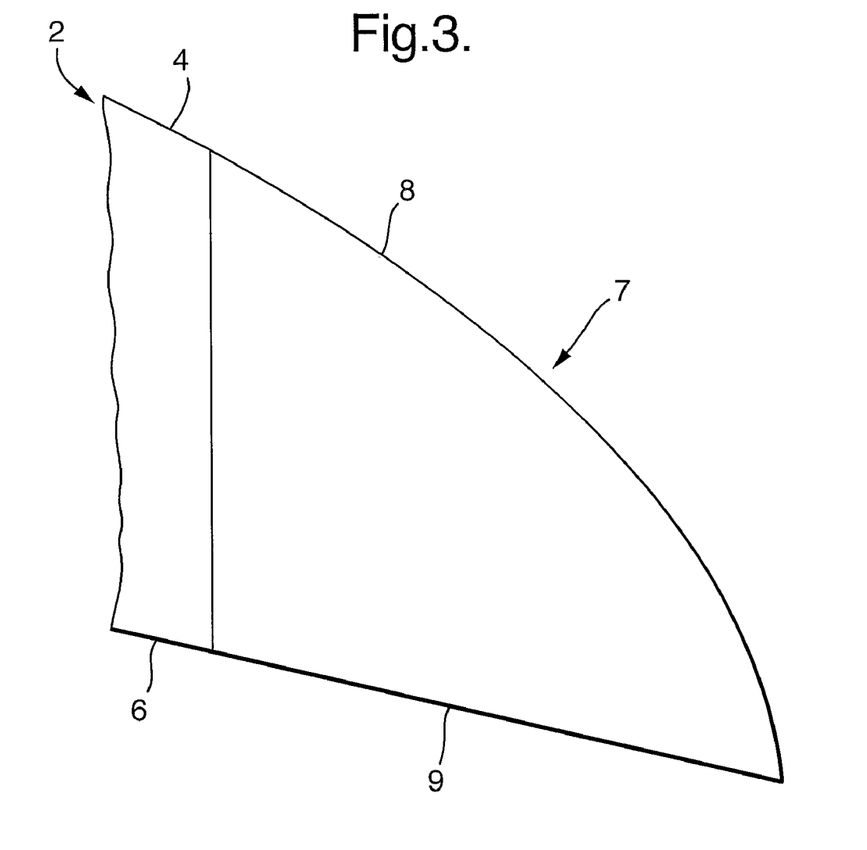
FIG. 3 is a plan view of a second illustrative embodiment of a tip device according to the invention as fitted to an aircraft wing.
Figure 4:
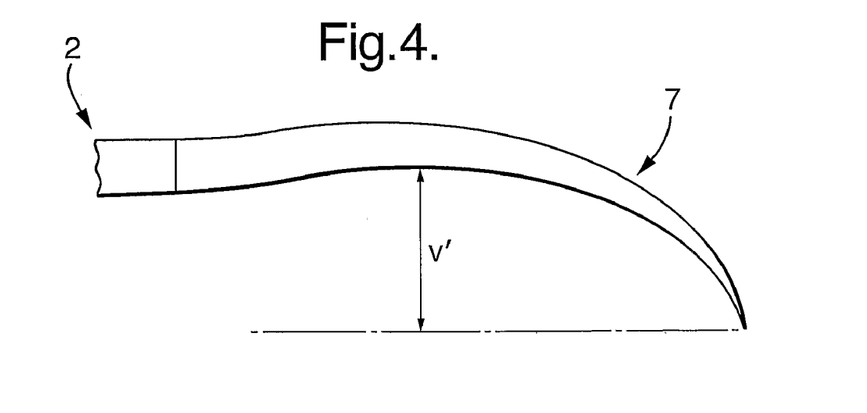
FIG. 4 is a view from the rear of the device of FIG. 3.

Referring to FIGS. 3 and 4, there is illustrated a second embodiment 7 of a tip device according to the invention as fitted to the outboard end of the wing 2. As before the starboard tip region is illustrated, it being understood that the port tip will be fitted with an equivalent device in mirror image to the device 7.

In planform, as shown in FIG. 3, the device 7 has a swept leading edge 8 of substantially elliptical form with a sweep angle continuously increasing in the outboard direction, blending from the angle of the inboard main wing leading edge 4 at the root of the device to an angle approaching 90° at its tip. The trailing edge 9 of the device in this embodiment is substantially straight, forming an extension of the trailing edge 6 of the inboard main wing at the same constant sweep angle.

As shown in FIG. 4, the device 7 is also canted downwards. In this embodiment the profile of the device curves upwardly from the main wing 2 at the root portion of the device and then curves substantially elliptically downwards, with the negative cant angle continuously increasing in the outboard direction to an angle approaching 90° at its tip. The extent of downward bending v' in this embodiment is approximately four times the maximum aerofoil thickness at the position of maximum elevation (or approximately three times the maximum aerofoil thickness at the root of the device). The effect of the initial upward curvature of the device is to elevate the tip in comparison with an embodiment having the same amount of downward bending but commencing closer to the root, thus enhancing its ground clearance.

Figure 5:
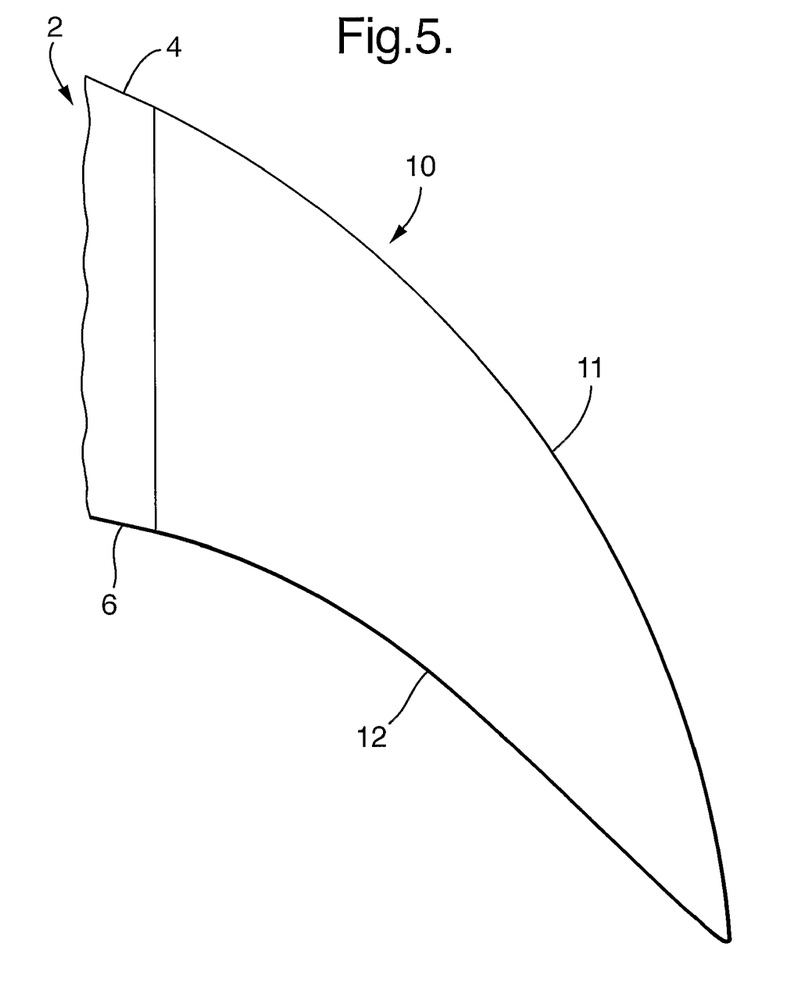
FIG. 5 is a plan view of a third illustrative embodiment of a tip device according to the invention as fitted to an aircraft wing.
Figure 6:
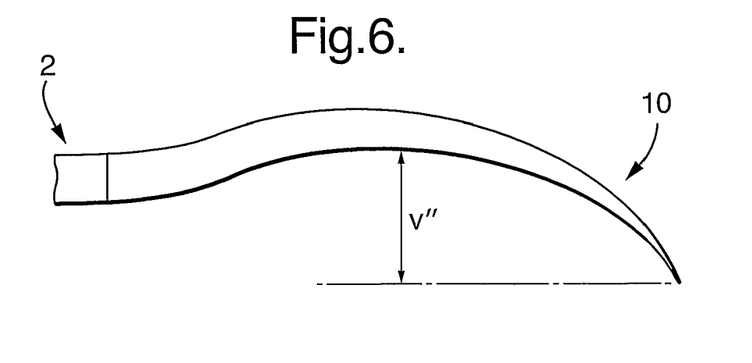
FIG. 6 is a view from the rear of the device of FIG. 5.

Referring to FIGS. 5 and 6, there is illustrated a further embodiment 10 of a tip device according to the invention as fitted to the outboard end of the wing 2. Once again the starboard tip region of the wing is illustrated, it being understood that the port tip will be fitted with an equivalent device in mirror image to the device 10.

In planform, as shown in FIG. 5, the device 10 is similar to the device 1, having a swept leading edge 11 of substantially elliptical form, with a sweep angle continuously increasing in the outboard direction, blending from the angle of the inboard main wing leading edge 4 at the root of the device to an angle of substantially 90° at its tip. The trailing edge 12 of the device in this embodiment is also curved back substantially parabolically, with a sweep angle continuously increasing in the outboard direction, blending from the angle of the inboard main wing trailing edge 6 at the root of the device to an angle of approximately 50° at its tip. An extent of rake back similar to the device 1 is therefore also exhibited.

As shown in FIG. 6, the device 10 is also canted downwards. In this embodiment the profile of the device features an upwardly curved portion at its root end reaching a higher positive cant angle than the device 7 and then curves substantially elliptically downwards, with the negative cant angle continuously increasing in the outboard direction to an angle of approximately 60° at its tip. The extent of downward bending v" in this embodiment is approximately four times the maximum aerofoil thickness at the position of maximum elevation (or approximately three times the maximum aerofoil thickness at the root of the device). The effect of the greater initial upward curvature of the device 10 is to further elevate the tip in comparison with the device 7 for still further enhanced ground clearance. Theoretical studies have shown that this degree of upward curvature does not have a significant deleterious effect on the aerodynamic performance of the device. In other embodiments the degree of upward curvature of the root portion may be still greater in comparison with the subsequent downward bending so that the tip of the device is positioned at the same level as, or even above, the level that would be occupied by the tip of a wing extension of the same span as the device but having the same continuous dihedral as the main wing 2.

Although not featured in the illustrated embodiments, tip devices in accordance with the invention may also be given a degree of twist, which may differ from the twist of the inboard main wing. The sectional profiles forming the bodies of such devices may also differ from the aerofoils of the main wings to which they are fitted.

The aerodynamic performance of the illustrated embodiments of the invention as fitted to an otherwise conventional trapzoidal main wing has been investigated using computational methods and more particularly using NEWPAN software (Flow Solutions Ltd) which executes a 3D panel method (the panel method being a rapid aerodynamic analysis tool with which those skilled in the art will be familiar). For the purposes of this investigation the aerofoils forming the devices 1, 7 and 10 were obtained through linear scaling of the transonic profile in the tip region of the main wing 2.

Figure 7:
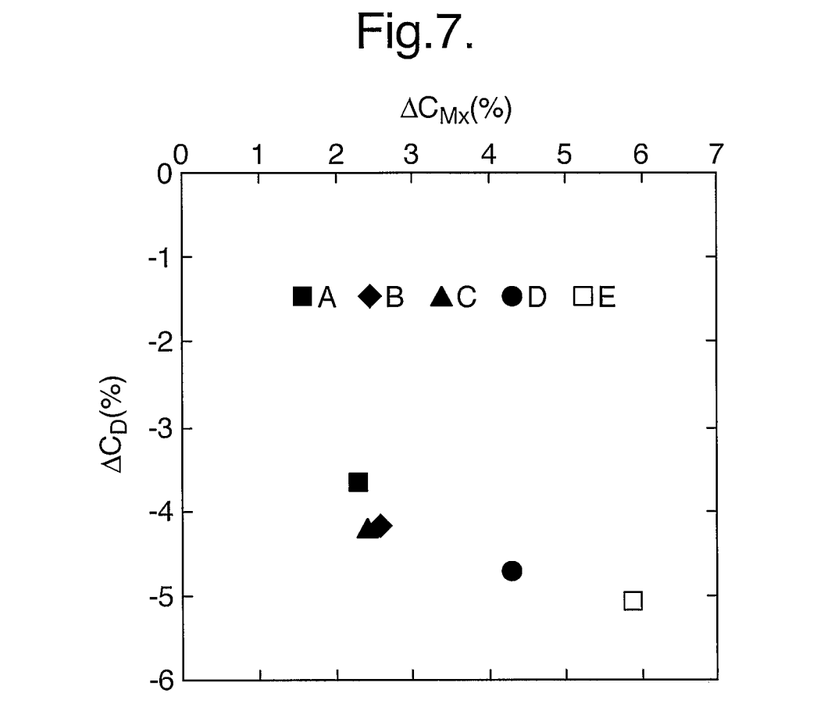
FIG. 7 is a plot of percentage drag reduction and wing root bending increase compared to a datum Küchemann tip for the devices of FIGS. 1 to 6 and for two illustrative prior art devices, as derived from panel method analysis.
Figure 8:
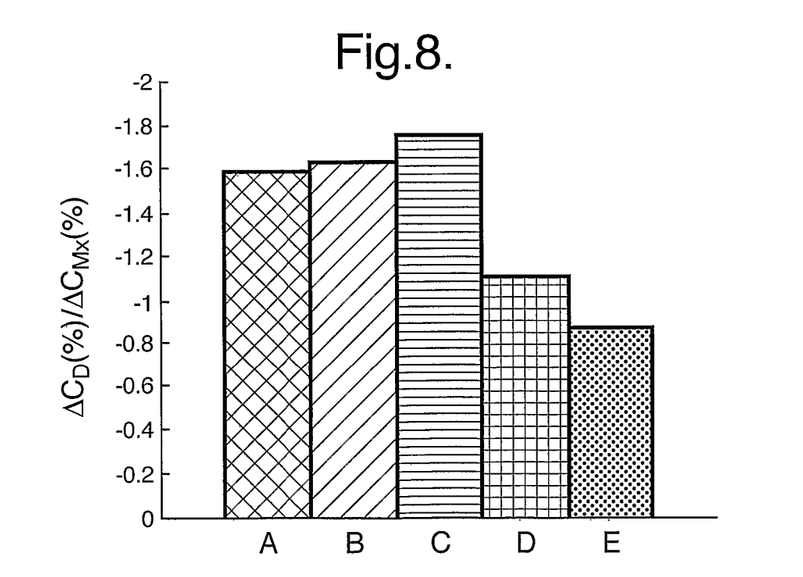
FIG. 8 illustrates graphically the ratio of the drag reduction to wing root bending increase for each of the tips in FIG. 7.

By means of this computational analysis there was derived for each of the devices 1, 7 and 10 the percentage reduction of aircraft drag coefficient ($\Delta C_D$ %) and the percentage increase in wing root bending moment coefficient ($\Delta C_{Mx}$ %) as compared to the same basic wing when fitted with a standard Kuchemann tip, for a typical cruise condition (2.5 g clean wing symmetric load case). It is recognised that the benefit of a 1% improvement in cruise drag is approximately balanced by the penalty of a 1% increase in wing weight (reference J. Jupp, Wing Aerodynamics and the Science of Compromise, The Aeronautical Journal, Volume 105, Number 1053, November 2001), so it follows that to secure an overall benefit from the addition of any drag-reducing device the percentage drag reduction which it achieves should exceed the percentage weight increase resulting from its presence. Therefore assuming that a 1% increase in wing root bending is directly related to a 1% increase in wing weight, the two parameters $\Delta C_D$ % and $\Delta C_{Mx}$ % are ideally suited to assess a trade off between drag reduction and weight penalty. Equivalent analysis was also performed for the same basic wing when fitted with illustrative prior art drag-reducing wing tip devices of two different kinds namely (i) a typical conventional upwardly canted winglet and (ii) a raked back but uncanted wing tip extension of the kind described in U.S. Pat. Nos. 5,039,032 and 6,089,502. Results are presented in FIGS. 7 and 8 and are indicated for the various devices as follows;

A—device 7 of the present invention
B—device 10 of the present invention
C—device 1 of the present invention
D—uncanted raked back tip
E—canted up winglet FIG. 7 shows that relative to the datum Küchemann tip the three analysed embodiments of the invention (A, B and C) offer a drag reduction ($\Delta C_D$ %) approaching that of the uncanted raked back tip (D) but with only about half of the increase in wing root bending ($\Delta C_{Mx}$ %). The conventional winglet (E) offers the best drag reduction but with an increase in wing root bending which is almost three times that of the analysed embodiments of the invention. FIG. 8 shows that on the basis of a "figure of merit" ($\Delta C_D$ %/$\Delta C_{Mx}$ %) balancing the two effects the prior art devices (D & E) are found to provide a similar benefit while all the embodiments of the present invention (A, B & C) provide a significantly better result. Of those embodiments the raked back devices 1 and 10 (C & B) provide slightly better results than the device 7 (A), with the purely bent down device 1 providing the best. This analysis did not take account of torsional effects, however, and it is postulated that in practice the performance of the devices 1 and 10 may be even more favourable due to the centre of lift being further aft and the resultant reduction of twist at the tip serving further to relieve wing root bending.

In all the illustrated embodiments of the invention all spanwise upward and/or downward bending of the respective device is operated around an axis substantially parallel to the longitudinal axis of the aircraft/line of flight, with the direction and rate of such bending of both the leading and trailing edge at any spanwise position being consistent, although this might not be an essential feature of all other possible embodiments.

Figure 9:
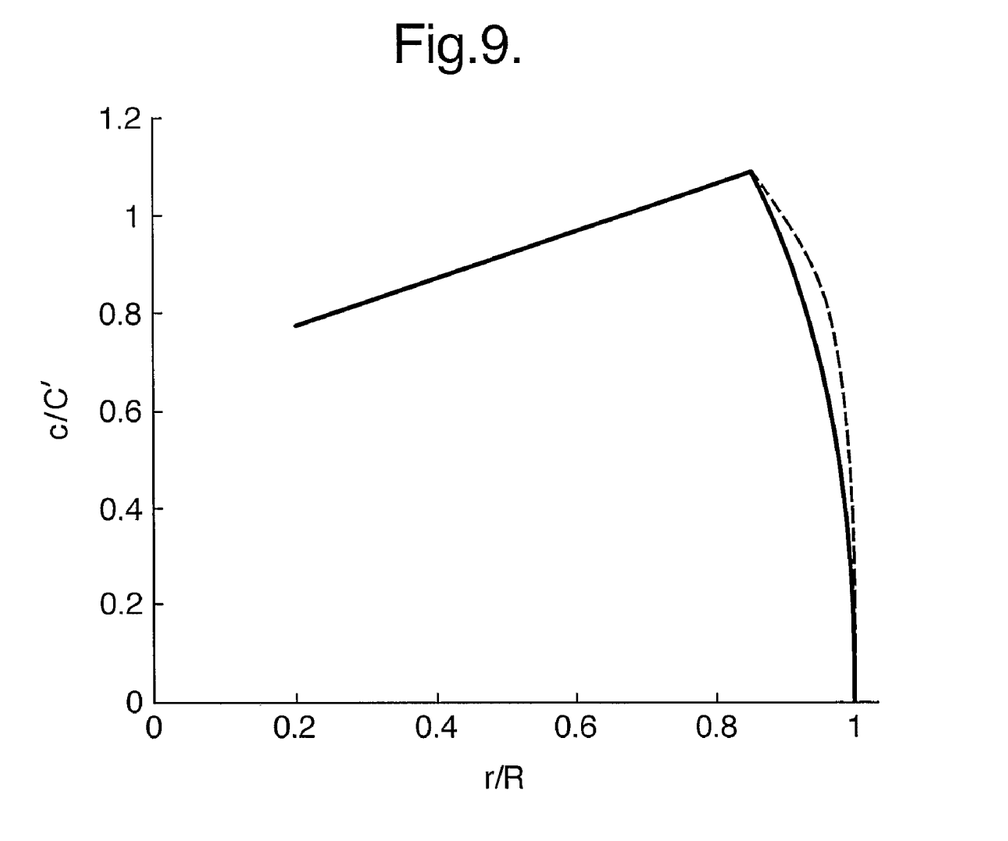
FIG. 9 is a plot of chord distribution for a typical helicopter rotor blade fitted with tip devices according to the invention.

Tip devices of equivalent shapes to those illustrated in FIGS. 1 to 6 may also be fitted at the outboard ends of helicopter rotor blades. Initial studies indicate that this may achieve a significant reduction in hover power, particularly in the case of devices with an upward/downward spanwise bend such as those of FIGS. 4 and 6. FIG. 9 illustrates the chord distribution of a typical helicopter rotor blade fitted with such devices at the 85% blade radius position, expressed in terms of local chord c over mean chord $C^1$ vs. local radius r over total radius R. In other words the respective tip device occupies the region of the plot from r/R=0.85 to r/R=1, the solid line in this region depicting the chord distribution for the non-raked back device of FIG. 3 and the broken line depicting the chord distribution for the raked back devices of FIGS. 1 and 5. "Mean chord" is a parameter conventionally used in describing the shapes of rotorcraft blades and is defined in, for example, U.S. Pat. No. 5,332,362.

The invention claimed is:

1. A tip device to act as an outboard continuation of an aerodynamic lifting surface, said lifting surface being without anhedral, wherein said device has a downward cant angle and in planform has a leading edge swept back in relation to the leading edge of the lifting surface inboard thereof, a trailing edge swept back in relation to the trailing edge of the lifting surface inboard thereof and at a sweep angle which increases in the outboard direction of the device at least from a position substantially outboard of the root of the device, and a chord reducing substantially monotonically from the root to the tip of the device; wherein the aft extension of the device, from the position from which its trailing edge is swept back in relation to the trailing edge of the lifting surface inboard thereof, is greater than about two thirds of the lifting surface chord length at said position; wherein both the leading and trailing edges of the device have a downward cant angle which increases in the outboard direction of the device, and wherein the trailing edge at the tip of the device is located below the lower surface crest point of the lifting surface at the position from which the downward cant angle commences by at least twice the maximum lifting surface thickness at that position.

2. A tip device according to claim 1 wherein in planform the sweep angle of the leading edge thereof increases in the outboard direction of the device.

3. A tip device according to claim 2 wherein in planform the leading edge thereof is a curve with substantially continuously increasing sweep angle in the outboard direction of the device.

4. A tip device according to claim 3 wherein in planform the leading edge thereof curves substantially elliptically.

5. A tip device according to claim 1 wherein in planform the sweep angle of the leading edge thereof reaches approximately 90° at the tip of the device.

6. A tip device according to claim 1 wherein in planform the trailing edge thereof is a curve with substantially continuously increasing sweep angle in the outboard direction of the device.

7. A tip device according to claim 6 wherein in planform the trailing edge thereof curves substantially parabolically.

8. A tip device according to claim 1 wherein the chord reduces to approximately zero at the tip of the device.

9. A tip device according to claim 1 wherein the device is curved downwardly with a substantially continuously increasing downward cant angle in the outboard direction of the device commencing from a specified spanwise position thereof.

10. A tip device according to claim 9 wherein the device curves downwardly substantially elliptically.

11. A tip device according to claim 9 wherein the device curves downwardly about an axis substantially parallel to the line of flight.

12. A tip device according to claim 1 wherein said downward cant angle reaches approximately 90° at the tip of the device.

13. A tip device according to claim 1 wherein the trailing edge at the tip of the device is located below the lower surface crest point of the lifting surface at the root of the device by a distance of at least twice the maximum lifting surface thickness that position.

14. A tip device according to claim 1 wherein the trailing edge at the tip of the device is located below the lower surface crest point of the lifting surface at the position from which the downward cant angle commences by a distance of at least twice the maximum lifting surface thickness at the root of the device.

15. A tip device according to claim 1 also comprising a portion at the root end thereof upwardly canted in relation to the lifting surface inboard thereof, from which the downward cant angle of the device commences in spanwise succession.

16. An aerodynamic lifting surface having a tip equipped with or in the form of a device according to claim 1.

17. A fixed wing aircraft having wings of which the tips are equipped with or are in the form of devices according to claim 1.

18. A helicopter having rotor blades of which the tips are equipped with or are in the form of devices according to claim 1.

19. A tip device according to claim 1 wherein the aft extension of the device, from the position from which its trailing edge is swept back in relation to the trailing edge of the lifting surface inboard thereof, is at least approximately equal to the lifting surface chord length at said position.

20. A tip device according to claim 1 wherein in planform the sweep angles of both the leading and trailing edges thereof increase in the outboard direction of the device and those edges meet substantially at a point.

21. A tip device according to claim 1 wherein in planform the sweep angle of the leading edge thereof does not exceed approximately 90°.

22. A fixed wing aircraft having propeller blades of which the tips are equipped with or are in the form of devices according to claim 1.

23. A tip device according to claim 1 wherein the device has a downward cant angle extending substantially to the tip of the device.

* * * * *